H. R. HUGHES.
ROTARY DISK DRILL.
APPLICATION FILED AUG. 4, 1914.
1,174,578. Patented Mar. 7, 1916.
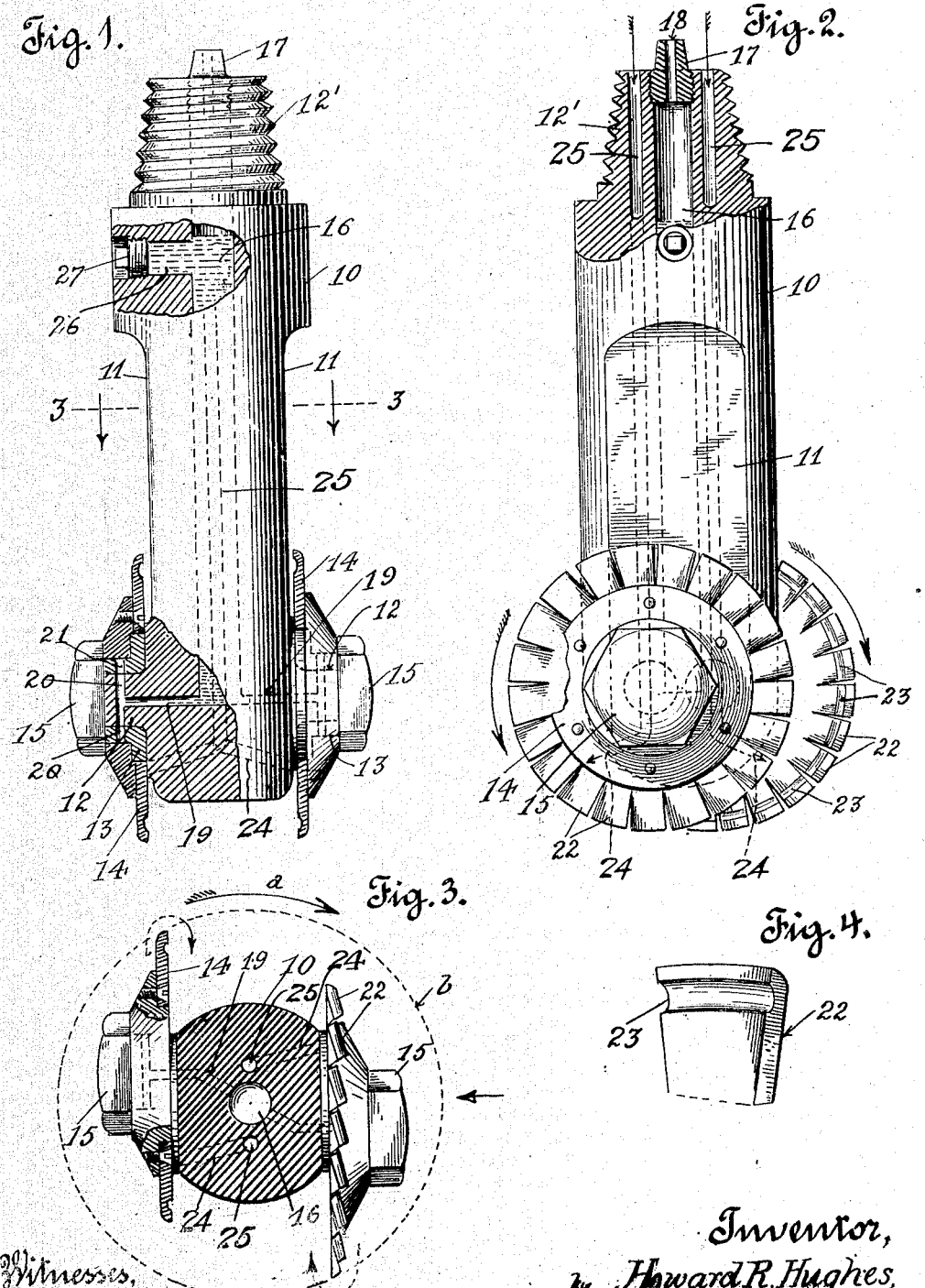

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

ROTARY DISK DRILL.

1,174,578.  Specification of Letters Patent.  Patented Mar. 7, 1916.

Application filed August 4, 1914. Serial No. 854,977.

*To all whom it may concern:*

Be it known that I, HOWARD R. HUGHES, a citizen of the United States, residing at Houston, in the county of Harris, State of Texas, have invented new and useful Improvements in Rotary Disk Drills, of which the following is a specification.

This invention relates to a rotary disk drill, and particularly pertains to improvements in rotary disk drills of that type in which a pair of revoluble cutting disks are mounted in offset relation to each other on the opposite sides of the drill shank.

One object of this invention is to provide a drill disk which is so constructed that rotation thereof in relation to the drill shank will be insured when the drill is in operation, thereby preventing excessive wear on the cutting edge of the disk.

Another object is to increase the cutting capacity of the disk by forming a series of diagonally disposed cutting teeth on the edge thereof and to so shape the teeth that when the drill is operating in a heavy tenacious soil the soil will not be formed in spiral shavings but will be completely broken up so as to facilitate its removal by the wash-water.

Another object is to provide a disk-drill which is equipped with a cutting disk having a serrated cutting edge so shaped that materials adhering thereto may be readily removed by the flow of water through the drill shank, the drill being so designed that water will be directed between the serrations or teeth on the cutting disk in such direction as to effectively remove accumulations therefrom.

A further object is to provide an efficient means for delivering lubricant to the bearings of the cutting disks while the drill is in operation to reduce the wear on the bearings and at the same time insure easy rotation of the disks in relation to the drill shank as the latter revolves.

It is also an object to provide a drill shank having a lubricant reservoir for holding a lubricating medium that is supplied to the bearings of the disks when the drill is in operation, the shank being so constructed that the reservoir may be filled without removing the drill shank from its rotating stem.

The invention is illustrated in the accompanying drawings, in which:

Figure 1 is a view in side elevation of a rotary disk drill constructed in accordance with this invention, with parts broken away to illustrate the manner of directing lubricating oil to the bearings of the cutting disks, and showing the manner of directing the flow of wash-water through the drill shank between the serrations of the cutting disks. Fig. 2 is a view at right angles to Fig. 1 with parts broken away to illustrate the oil and water ducts. Fig. 3 is a horizontal section and plan on the line 3—3 of Fig. 1. Fig. 4 is a detail in perspective of one of the cutting teeth as viewed from the rear face of the disk.

More specifically, 10 indicates the head or shank of the drill which is of general cylindrical shape with parallel flat faces 11 formed on the opposite sides thereof which extend from the lower end of the shank 10 and terminate at a point a short distance below the upper end thereof. The upper end of the shank is formed with a tapered externally threaded portion 12′ adapted to be screwed into the drill stem on which the shank 10 is designed to be mounted.

Formed on the flat faces 11 and extending at right angles thereto are arbors 12 which lie in the same horizontal plane and are offset in relation to each other on opposite sides of the vertical center of the shank 10. These arbors 12 are fitted with bushings 13 on which rotary cutting disks 14 are revolubly mounted; the cutting disks 14 being held in place on the arbors 12 by means of cap nuts 15, and being so designed and arranged that the advancing edges of same will form a hole through which the drill can descend.

As a means for lubricating the bearing of the disks 14 on the bushings 13, a central oil reservoir or bore 16 is formed in the shank 10 extending longitudinally thereof; the upper end of the bore 16 terminating at the upper end of the shank 10 and being threaded to receive a plug 17 formed with a small aperture 18 so as to cause the flushing water which passes down through the drill stem to exert pressure on the lubricating medium in the reservoir 16′. The lower end of the bore 16 communicates with transverse ducts 19 extending into the arbors 12 and having lateral branches 20 opening and communicating with the peripheries of the arbors 12 to perforations 21 formed in the bushings 13.

By offsetting the arbors 12, as before stated, the cutting disks 14 thereon will be arranged in relation to the drill shank and each other as particularly shown in Fig. 3. That is, one of the disks will project to one side of the drill shank beyond the rear edge of the other disk, which in turn projects beyond the opposite side of the drill shank beyond the rear edge of the first named disk.

The outermost portions of the disks constitute their forward or advancing edges, which, when the drill shank 10 is rotated in the direction indicated by the arrow —a— in Fig. 3, will traverse a path indicated by the dotted line —b— in Fig. 3.

To effect and insure a continuous cutting action of the disks 14 and also insure the rotation thereof on their arbors 12 as the shank 10 is rotated, the disks 14 are provided at their peripheries with radially-disposed cutting teeth 22 which are separated from each other by means of slits or openings; these teeth extending diagonally to the axes of the disks with their outer edges projecting in the direction of rotation of the disks so as to present the inclined edge and rear face of the disk to the materials being cut in such manner that the resistance of the materials against the inclined edges and rear faces of the teeth will tend to rotate the disks on their arbors as the drill shank revolves and advances the forward edges of the disks into the material being drilled.

To insure a cutting action of the disks as they are advanced by the rotation of the drill shank the peripheral edges of the teeth are beveled on their front faces to form knife edges as particularly shown in Fig. 4. To prevent the formation of continuous shavings where the drill is operating in heavy tenacious soils, which tend to clog the drill hole, the teeth 22 are formed with grooves 23 approximately semi-circular in cross section which extend transversely of the teeth parallel with their peripheral cutting edges and adjacent thereto; the grooves 23 operating to turn the materials severed by the peripheral cutting edges of the teeth and thereby cause the material to be broken up into short pieces.

In order to prevent accumulations of materials between the teeth 22 and between the disks and the shank of the drill, streams of water are directed against the inner faces of the disks so as to pass between the teeth 22 as the disks revolve on their arbors; the water being ejected from the lower end of the shank 10 through discharge orifices 24 connecting with ducts 25 leading to the upper end of the drill shank and opening to the interior of the drill pipe or stem to which the shank is attached.

The drill shank 10 is mounted on a drill pipe or stem of any suitable construction and in the drilling operation said stem is rotated in the direction indicated by the arrow —a— in Fig. 3, thereby causing the cutting disks 14 on the shank to advance around the axis of the shank 10 in parallel relation with each other; the disks 14 rotating on their arbors 12 as they are thus advanced so as to cause the teeth 22 to penetrate and shear the soil with which they are engaged. The loosened soil crowding between the teeth of the disks exerts pressure on the inclined faces thereof tending to rotate the disks on their arbors and thus preventing the cutting edges of the disks from becoming worn unevenly, as would occur if the disks did not revolve on their axes.

A constant stream of water is projected against each disk as before stated to remove accumulations from between the teeth 22 and also carry away the materials loosened by the disk; the water being delivered through the drill stem and the ducts 25 in the drill shank. A lubricating medium contained in the bore 16 is delivered to the bearings of the cutting disks by the pressure of water thereon which enters the bore 16 through the aperture 18 in the plug 17, thus maintaining the bearings of the cutting disks in a lubricated condition.

As a means for introducing lubricating oil into the reservoir formed by the bore 16 without removing the drill shank from its stem a lateral bore 26 is formed in the drill shank 10 and is threaded to receive a plug 27. The plug 27 is removed to permit the introduction of oil into the bore 16 as occasion requires.

What I claim is:

1. In a rotary boring drill, the combination of a solid shank or head, a pair of rotatable cutting disks arranged vertically on the outside of said head in parallel relation to each other and in such a manner that they form a hole through which the drill can descend by reason of their peripheral edge portions shearing off the material from the side wall of the hole when the head is rotated, the axes of said disks being offset slightly in a horizontal plane and each of said disks having a relatively thin edge portion provided with diagonally-disposed teeth, and means for discharging streams of flushing water from the lower end portion of the head so as to prevent the disintegrated material from becoming packed around the disks or around said head.

2. A rotary disk drill, comprising a drill shank, a pair of complementary cutting disks arranged in parallel relation to each other and revolubly mounted on the sides of the drill shank with the outer edges of the disks on their horizontal diameters offset in relation to each other, and diagonally arranged teeth on the peripheries of said disks.

3. In a rotary disk drill, a cutting disk formed with a series of peripheral teeth, said teeth arranged in diagonal relation to the axis of the disk and formed with beveled peripheral edges and having grooves on their rear faces extending parallel with their peripheral edges.

4. In a rotary disk drill, a cutting disk having a series of peripheral teeth arranged in diagonal relation to the axis of the disk having grooves on their rear faces extending parallel with their peripheral edges adjacent thereto.

5. A rotary disk drill, comprising a shank formed with water ducts opening at the lower end of the shank in diagonal relation to the axis thereof, and a pair of vertically-disposed complementary cutting disks revolubly mounted on the opposite sides of said shank in parallel relation to each other and formed with peripheral teeth between which the water discharged from the ducts is ejected, the axes of said disks being offset slightly in a horizontal plane.

6. In a rotary disk drill, a drill shank having arbors extending outwardly from the sides thereof and formed with a bore constituting a lubricant reservoir with ducts leading from said bore to the outer faces of the arbors, an apertured plug threaded in the outer end of the bore, and a second plug threaded in a bore in the side of the shank communicating with the first named bore.

7. In a rotary boring drill, the combination of a shank or head, a pair of rotatable cutting disks arranged vertically on said head in parallel relation to each other and in such a manner that the advancing edges of same will form a hole through which the drill can descend, the axes of said disks being offset slightly in a horizontal plane, and means for discharging streams of flushing water from the lower end portion of the head, laterally against said disks so as to prevent the disintegrated material from becoming packed around the disks or around said head, said disks being provided on their peripheral edges with diagonally disposed cutting teeth.

8. A rotary boring drill, comprising a head, a rotatable cutting disk arranged on said head in an upright position and provided at its periphery with radially-disposed, diagonal cutting teeth that have sharp advancing edges, and means for discharging a jet of water laterally from the head against one side of said disk so as to keep the teeth on same clean.

9. A cutting disk for rotary boring drills consisting of a circular-shaped member whose edge portion is made up of a plurality of diagonally-arranged cutting teeth that are separated from each other by means of radial slits, each tooth being provided on one side with a groove that extends parallel to the outer end of the tooth.

10. A rotary boring drill, comprising a head, a pair of rotatable cutting disks arranged in an upright position on said head in parallel relation to each other and having their axes offset slightly in a horizontal plane, each of said disks being provided at its periphery with diagonally-disposed cutting teeth, and means for discharging streams of flushing water laterally from the lower end portion of the head against the inner side faces of said disks.

11. A rotary boring drill, comprising a solid head provided on its outer surface with a pair of vertically-disposed, flat bearing faces that lie parallel to each other, spindles on the head that project laterally from said flat bearing faces and which are offset or staggered slightly with relation to each other in a horizontal plane, cutting disks rotatably mounted on said spindles and provided at their peripheral edges with diagonally-disposed cutting teeth, and means for discharging water into the hole being formed so as to flush out the disintegrated material and prevent it from becoming packed around the drill.

12. A rotary boring drill, comprising a head provided with a pair of vertically-disposed, flat bearing faces that lie parallel to each other, integral spindles on the head that project laterally from said flat bearing faces and which are offset or staggered slightly with relation to each other in a horizontal plane, and cutting disks rotatably mounted on said spindles and provided at their peripheral edges with diagonally-disposed cutting teeth, said head being provided with water courses which terminate in the flat bearing faces against which the inner sides of said disks bear.

In witness that I claim the foregoing I have hereunto subscribed my name this 15th day of July, 1914.

HOWARD R. HUGHES.

Witnesses:
MARGUERITE BATES.
MARIE BATTEY.